United States Patent
Harmer et al.

(10) Patent No.: US 9,790,342 B2
(45) Date of Patent: Oct. 17, 2017

(54) CLOSED-CELL TANNIN-BASED FOAMS WITHOUT FORMALDEHYDE

(75) Inventors: Mark Andrew Harmer, Landenberg, PA (US); Vivek Kapur, Kennett Square, PA (US); Sharlene Renee Williams, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 14/118,916

(22) PCT Filed: May 25, 2012

(86) PCT No.: PCT/US2012/039756
§ 371 (c)(1),
(2), (4) Date: Nov. 20, 2013

(87) PCT Pub. No.: WO2012/162684
PCT Pub. Date: Nov. 29, 2012

(65) Prior Publication Data
US 2014/0093719 A1  Apr. 3, 2014

Related U.S. Application Data

(60) Provisional application No. 61/489,854, filed on May 25, 2011, provisional application No. 61/489,787, (Continued)

(51) Int. Cl.
| B32B 3/26 | (2006.01) |
|---|---|
| C08J 9/12 | (2006.01) |
| B32B 5/18 | (2006.01) |
| B32B 5/02 | (2006.01) |
| B32B 7/12 | (2006.01) |
| B32B 13/04 | (2006.01) |
| B32B 15/04 | (2006.01) |
| B32B 15/18 | (2006.01) |
| B32B 15/20 | (2006.01) |
| B32B 21/04 | (2006.01) |
| B32B 27/06 | (2006.01) |
| B32B 27/32 | (2006.01) |
| B32B 27/34 | (2006.01) |
| B32B 27/36 | (2006.01) |
| B32B 29/00 | (2006.01) |
| C08G 65/40 | (2006.01) |
| C08J 9/14 | (2006.01) |

(52) U.S. Cl.
CPC ............ *C08J 9/12* (2013.01); *B32B 5/022* (2013.01); *B32B 5/024* (2013.01); *B32B 5/18* (2013.01); *B32B 7/12* (2013.01); *B32B 13/045* (2013.01); *B32B 15/046* (2013.01); *B32B 15/18* (2013.01); *B32B 15/20* (2013.01); *B32B 21/047* (2013.01); *B32B 27/065* (2013.01); *B32B 27/32* (2013.01); *B32B 27/34* (2013.01); *B32B 27/36* (2013.01); *B32B 29/007* (2013.01); *C08G 65/40* (2013.01); *C08J 9/141* (2013.01); *C08J 9/146* (2013.01); *B32B 2250/40* (2013.01); *B32B 2255/26* (2013.01); *B32B 2266/02* (2013.01); *B32B 2266/0214* (2013.01); *B32B 2266/0228* (2013.01); *B32B 2266/0278* (2013.01); *B32B 2266/06* (2013.01); *B32B 2266/08* (2013.01); *B32B 2266/104* (2016.11); *B32B 2266/126* (2016.11); *B32B 2307/304* (2013.01); *B32B 2419/00* (2013.01); *C08J 2205/052* (2013.01); *C08J 2397/00* (2013.01); *C08J 2399/00* (2013.01); *C08J 2459/00* (2013.01); *Y10T 428/249976* (2015.04)

(58) Field of Classification Search
None
See application file for complete search history.

(56) References Cited

U.S. PATENT DOCUMENTS

| 4,354,994 A | 10/1982 | Williams |
|---|---|---|
| 4,390,642 A | 6/1983 | Smith |

(Continued)

FOREIGN PATENT DOCUMENTS

| DE | 2625811 A1 | 12/1976 |
|---|---|---|
| GB | 1544411 A | * 4/1979 |
| JP | 2007070512 A | * 3/2007 |

OTHER PUBLICATIONS

Takahashi et al., Phenol Resin Foamed Plate, Mar. 22, 2007, machine translation of JP2007-070512.*

(Continued)

*Primary Examiner* — Chinessa Golden

(57) ABSTRACT

Disclosed are foam compositions and processes to form closed-cell tannin-based foams. The foams comprises a continuous polymeric phase defining a plurality of cells, wherein the continuous polymeric phase comprises a tannin-based resin derived from a tannin and a monomer, wherein the monomer comprises furfural, glyoxal, acetaldehyde, 5-hydroxymethylfurfural, acrolein, levulinate esters, sugars, 2,5-furandicarboxylic acid, 2,5-furandicarboxylic aldehyde, urea, difurfural (DFF), furfuryl alcohol, glycerol, sorbitol, lignin, or mixtures thereof, and wherein the plurality of cells comprises a plurality of open-cells and a plurality of closed-cells with an open-cell content measured according to ASTM D6226-5, of less than 50%. The foam composition also comprises a discontinuous phase disposed in at least a portion of the plurality of closed-cells, the discontinuous phase comprising one or more blowing agents.

17 Claims, No Drawings

Related U.S. Application Data filed on May 25, 2011, provisional application No. 61/489,790, filed on May 25, 2011, provisional application No. 61/489,795, filed on May 25, 2011, provisional application No. 61/489,803, filed on May 25, 2011, provisional application No. 61/489,847, filed on May 25, 2011.

(56) References Cited

U.S. PATENT DOCUMENTS

| | | | |
|---|---|---|---|
| 4,861,642 A * | 8/1989 | Stagg et al. | 428/139 |
| 5,444,098 A * | 8/1995 | Wallaeys et al. | 521/95 |
| 6,231,651 B1 * | 5/2001 | Schultz | A01N 43/653 106/18.32 |
| 2003/0158277 A1 * | 8/2003 | Blanpied et al. | 521/131 |
| 2009/0214853 A1 * | 8/2009 | Quist et al. | 428/319.1 |
| 2010/0010111 A1 | 1/2010 | Coppock et al. | |
| 2010/0280141 A1 | 11/2010 | Loh et al. | |

OTHER PUBLICATIONS

International Search Report dated May 28, 2014, International Application No. PCT/US2012/039756.

Meikleham, N. E. et al., Acid- and Alkali-Catalyzed Tannin-Based Rigid Foams, Journal of Applied Polymer Science, 1994, pp. 1547-1556, vol. 53.

Link, Martin et al., Formaldehyde-Free Tannin-Based Foams and Their Use As Lightweight Panels, BioResources, 2011, pp. 4218-4228, vol. 6, No. 4.

Pizzi, A. et al., Matrix-Assisted Laser Desorption/Ionization Time-of-Flight Structure Determination of Complex Theromset Networks: Polyflavonoid Tannin-Furanic Rigid Foams, Journal of Applied Polymer Science, 2008, pp. 1451-1456, vol. 110.

Zhao, W. et al., Effect of composition and processing parameters on the characteristics of tannin-based rigid foams. Part I: Cell structure, Materials Chemistry and Physics, 2010, pp. 175-182, vol. 122.

Zhao, W. et al., Effect of composition and processing parameters on the characteristics of tannin-based rigid foams. Part II: Physical Properties, Materials Chemistry and Physics, 2010, pp. 210-217, vol. 123.

Pizzi, A., Tannin-Based Neutral and Alkaline Phenolic-Type Foams, Journal of Applied Polymer Science, 1979, pp. 1901-1905, vol. 23.

Tondi, G. et al., Tannin-based carbon foams, Carbon, 2009, pp. 1480-1492, vol. 47.

Tondi, G. et al., Tannin-based rigid foams: A survey of chemical and physical properties, Bioresource Technology, 2009, pp. 5162-5169, vol. 100.

Tondi, G. et al., Natural Tannin-Based Rigid Foams as Insulation for Doors and Wall Panels, Maderas. Ciencia y Tecnologia, 2008, pp. 219-227.

Tondi, G. et al., Tannin-based rigid foams: Characterization and modification, Industrial Crops and Products, 2009, pp. 356-363, vol. 29.

Tondi, G. et al., X-Ray Microtomography Studies of Tannin-Derived Organic and Carbon Foams, Microscopy and Microanalysis, 2009, pp. 384-394, vol. 15.

Tondi et al., "X-Ray Microtomography Studies of Tannin-Derived Organic and Carbon Foams", Microscopy and Microanalysis, 15, 384-394, 2009.

* cited by examiner

CLOSED-CELL TANNIN-BASED FOAMS WITHOUT FORMALDEHYDE

This application claims benefit under 35 U.S.C. §119(e) of U.S. Provisional Patent Application Nos. 61/489,854; 61/489,787; 61/489,790; 61/489,795; 61/489,803; and 61/489,847 filed on May 25, 2011, which are herein incorporated by reference.

FIELD OF THE INVENTION

This invention relates in general to tannin-based foams and in particular to compositions and processes for producing closed-cell tannin-based foams.

BACKGROUND INFORMATION

Due to depleting world energy resources and global warming, there is a drive to improve energy efficiency of new and existing commercial and residential buildings. One of the strategies is to improve thermal insulation around the buildings. Currently, the building industry uses several different forms of insulation materials, for example, glass fibers and mineral fibers. However, glass and mineral fibers exhibit high thermal conductivity in the range of 0.03-0.04 W/m·K. In comparison, aerogels exhibit thermal conductivity in the range of 0.008-0.012 W/m·K, but aerogels are very fragile and lack the mechanical strength needed for thermal insulation for building applications.

Apart from fibrous insulation, certain types of polymeric foams are commonly used for insulation applications that exhibit thermal conductivity in between those of glass fibers and aerogel materials. Only foams that are blown from low thermal conductivity blowing agents and result in a predominantly closed cell structures, with significant fraction of the blowing agent trapped within the closed cells, can exhibit low thermal conductivity and high insulating values. Commercial foams with high insulation value are blown from low temperature boiling liquids such as hydrocarbons and hydro fluorocarbons (HFCs), which exhibit a gas phase thermal conductivity in the range of 0.008-0.015 W/m·K. Therefore, the foams that result from such blowing agents can exhibit thermal conductivity in the range 0.018-0.030 W/m·K. However, some of the hydrocarbons and hydro fluorocarbons (HFCs) are being phased out due to their ozone depletion potential (ODP) and global warming potential (GWP).

Furthermore, closed-cell foams derived from polystyrene and polyurethane that can have a thermal conductivity of less than 0.03 W/m·K are highly flammable and thus have limited application as building insulation material even with the addition of flame retardants. Foams derived from polyisocyanurates exhibit better flame resistance than polystyrene and polyurethane, and phenolic foams exhibit even better flame resistance than polyisocyanurate foams. However, phenolic foams use a phenol based monomer which is produced from a petroleum feedstock, a depleting non-renewable resource and formaldehyde as another monomer, which is classified as human carcinogen.

Link et al., *BioResources*, 6(4), 4218-4228, disclose synthesis of formaldehyde-free tannin-based foams using mimosa tannin and furfuryl alcohol in an acid environment applying a temperature between 120° C. and 160° C.

Hence, there is a need for low thermal conductivity and fire resistant polymeric foams free of formaldehyde and made from renewable sources having a closed-cell structure with trapped blowing agent preferably with low ODP and low GDP.

SUMMARY OF THE INVENTION

In an aspect of the invention, there is a foam comprising:
 (a) a continuous polymeric phase defining a plurality of cells, wherein:
  the continuous polymeric phase comprises a tannin-based resin derived from a tannin, and a monomer, the monomer comprising furfural, glyoxal, acetaldehyde, 5-hydroxymethylfurfural, acrolein, levulinate esters, sugars, 2,5-furandicarboxylic acid, 2,5-furandicarboxylic aldehyde, urea, difurfural (DFF), furfuryl alcohol, glycerol, sorbitol, lignin, or mixtures thereof,
  the plurality of cells comprises a plurality of open-cells and a plurality of closed-cells with an open-cell content measured according to ASTM D6226-5, of less than 50%; and
 (b) a discontinuous phase disposed in at least a portion of the plurality of closed-cells, the discontinuous phase comprising one or more blowing agents.

In another aspect of the invention, there is a process comprising:
 (a) forming an agglomerate-free solution comprising:
  10-80% by weight of a tannin,
  5-80% by weight of a monomer, the monomer comprising furfural, glyoxal, acetaldehyde, 5-hydroxymethylfurfural, acrolein, levulinate esters, sugars, 2,5-furandicarboxylic acid, 2,5-furandicarboxylic aldehyde, urea, difurfural (DFF), furfuryl alcohol, glycerol, sorbitol, lignin, or mixtures thereof, and
  5-30% by weight of water,
 (b) mixing 1-30% by weight of one or more blowing agents with the agglomerate-free solution to form a pre-foam mixture; and
 (c) mixing 5-30% by weight of an acid catalyst with the pre-foam mixture to form a foam composition,
  wherein 0.5-10% by weight of a surfactant is added to at least one of the steps (a), (b), or (c), and
  wherein the amounts in % by weight are based on the total weight of the agglomerate-free solution;
 (d) processing the foam composition to form a foam.

The foregoing general description and the following detailed description are exemplary and explanatory only and are not restrictive of the invention, as defined in the appended claims.

DETAILED DESCRIPTION

Disclosed is a foam comprising a continuous polymeric phase defining a plurality of cells, wherein the continuous polymeric phase comprises a tannin-based resin derived from a tannin and a monomer, and wherein the plurality of cells comprises a plurality of open-cells and a plurality of closed-cells. The foam also comprises a discontinuous phase disposed in at least a portion of the plurality of closed-cells, the discontinuous phase comprising one or more blowing agents.

As used herein, the term "open-cell" refers to individual cells that are ruptured or open or interconnected producing a porous "sponge" foam, where the gas phase can move around from cell to cell. As used herein, the term "closed-cell" refers to individual cells that are discrete, i.e. each closed-cell is enclosed by polymeric sidewalls that minimize the flow of a gas phase from cell to cell. It should be noted that the gas phase may be dissolved in the polymer phase besides being trapped inside the closed-cell. Furthermore, the gas composition of the closed-cell foam at the moment of manufacture does not necessarily correspond to the equilibrium gas composition after aging or sustained use. Thus, the gas in a closed-cell foam frequently exhibits compositional changes as the foam ages leading to such known phenomenon as increase in thermal conductivity or loss of insulation value.

In one embodiment, the foam has an open-cell content of less than 50% or less than 40%, or less than 30%, as measured according to ASTM D6226-5. In another embodiment, the foam has an open-cell content of less than 20% or less than 10%, as measured according to ASTM D6226-5.

In an embodiment, the continuous polymeric phase of the foam comprises a tannin-based resin derived from a tannin and a monomer present in a weight ratio in the range of 1:0.005 to 1:4 or 1:0.01 to 1:2.

In an embodiment, the tannin used in the foam comprises bio-derived tannin. As used herein, bio-derived tannins are vegetable-based, extracted from leaf, bud, seed, root, bark, trunk, nut shells, skins of fruits, and stem tissues of plants and trees. Exemplary bio-derived tannins include, but are not limited to, mimosa, acacia, quebracho, pine, spruce, fir, tanoak, oak, birch, maple, eucalyptus, tare, catechu, or mixtures thereof. As used herein, the term "mimosa tannin" refers to a tannin extracted from leaf, bud, seed, root, bark, trunk, or stem tissues of a mimosa tree; and so on. In an embodiment, the continuous polymeric phase of the foam comprises a tannin-based resin derived from a monomer and a tannin comprising at least one of a mimosa tannin or a quebracho tannin, or a spruce tannin. In another embodiment, the tannin used in the foam comprises synthetic tannin. Synthetic tannins are also known as syntans. Exemplary syntans include, but are not limited to, sulfonated phenol-formaldehyde resins, sulfonated melamine-formaldehyde resin, sulfonated naphtalene-formaldehyde resins. In another embodiment, the tannin is a mixture of bio-derived tannin and syntan.

A suitable monomer is selected from furfural, glyoxal, acetaldehyde, 5-hydroxymethylfurfural, acrolein, levulinate esters, sugars, 2,5-furandicarboxylic acid, 2,5-furandicarboxylic aldehyde, urea, difurfural (DFF), furfuryl alcohol, glycerol, sorbitol, lignin, or mixtures thereof. Other suitable biomass derived monomers are disclosed in "*Liquid Phase catalytic Processing of Biomass-derived Oxygenated Hydrocarbons to fuels and Chemicals*", by Chheda et. al. in *Angewandte Chemie, Int.*, 2007, 46, 7164-7183, the disclosure of which is incorporated by reference herein in its entirety.

In one embodiment, the continuous polymeric phase of the foam comprises a formaldehyde-free tannin-based resin derived from a tannin and furfuryl alcohol. In another embodiment, the continuous polymeric phase of the foam comprises a formaldehyde-free tannin-based resin derived from a tannin, furfuryl alcohol, and furfural. As used herein, the term "formaldehyde-free tannin-based resin" means that the tannin-based resin is formed without the use of formaldehyde as a monomer.

As used herein, the term "blowing agent" is used interchangeably with the term "foam expansion agent". In general, the blowing agent must be volatile and inert, and can be inorganic or organic. In an embodiment, at least one of the one or more blowing agents has a gas phase thermal conductivity of less than or equal to 0.016 W/m·K or less than or equal to 0.014 W/m·K or less than or equal to 0.012 W/m·K at 25° C. In an embodiment, at least one of the one or more blowing agents present in the foam comprises 1,1,1,4,4,4-hexafluoro-2-butene available as FEA-1100 from E.I. du Pont de Nemours and Company (Wilmington, Del.). In another embodiment, at least one of the one or more blowing agents present in the foam comprises carbon dioxide; hydrocarbons such as pentane, isopentane, cyclopentane petroleum ether, and ether; hydrochlorofluorocarbons such as 1,1-dichloro-1-fluoroethane (HCFC-141b); 2,2-dichloro-1,1,1-trifluoroethane (HCFC-123); 1-chloro-1,1-difluoroethane (HCFC-142b); 1,1,1,2-tetrafluoroethane (HCFC-134a); 1,1,1,3,3-pentafluoropropane (HFC-245fa) available from Honeywell (Morristown, N.J.); 1,1,1,3,3-pentafluorobutane (HFC-365) available as Solkane® 365mfc from Solvay Chemicals (Bruxelles, Belgium); incompletely halogenated hydrocarbons such as 2-chloropropane; fluorocarbons such as dichlorodifluoromethane, 1,2-dichloro-1,1,2,2-tetrafluoroethane (CFC-114), trichlorotrifluoroethane (CFC-113), trichloromonofluoromethane (CFC-11), or mixtures thereof.

As used herein, ozone depletion potential (ODP) of a chemical compound is the relative amount of degradation to the ozone layer it can cause, with trichlorofluoromethane (CFC-11) being fixed at an ODP of 1.0. As used herein, the global-warming potential (GWP) used herein is a relative measure of how much heat a greenhouse gas traps in the atmosphere. It compares the amount of heat trapped by a certain mass of the gas in question to the amount heat trapped by a similar mass of carbon dioxide, which is fixed at 1 for all time horizons (20 years, 100 years, and 500 years). For example, CFC-11 has GWP (100 years) of 4750. Hence, from the global warming perspective, a blowing agent should have zero ODP and as low GWP as possible.

In some embodiments, at least one of the one or more blowing agents has an ozone depletion potential (ODP) of less than 2, or less than 1 or 0. In other embodiments, at least one of the one or more blowing agents has a global warming potential (GWP) of less than 5000, or less than 1000, or less than 500. An exemplary blowing agent with zero ODP and a low GWP is 1,1,1,4,4,4-hexafluoro-2-butene (ODP=0 and GWP=5).

In one embodiment, the foam has a density in the range of 10-500 kg/m$^3$, or 20-100 kg/m$^3$, or 20-80 kg/m$^3$.

In another embodiment, the foam has a thermal conductivity in the range of 0.015-0.05 W/m·K, or 0.015-0.04 W/m·K, or 0.015-0.03 W/m·K. The overall conductivity of the foam is strongly determined by the thermal conductivity of the gas phase or the discontinuous phase and the open-cell content of the foam. This is because the gas phase or the discontinuous phase disposed in at least a portion of the plurality of the closed-cells in a low-density foam (having a density in the range of 20-80 kg/m$^3$), usually makes up about 95% of the total foam volume. Hence, only those foams that are blown from low thermal conductivity blowing agents and result in closed cell structures, with significant fraction of the blowing agent trapped within the closed cells, can exhibit thermal conductivity lower than that of air. For example, if the open-cell content of a low density foam is more than 90%, then the foam will constitute mostly air, which exhibits a thermal conductivity in the range of 0.025-0.026 W/m·K at room temperature. Thus, a predominantly open-cell foam (with an open-cell content of more than 90%) will exhibit a thermal conductivity that is greater than 0.025 W/m·K. Similarly, a predominantly closed-cell foam (with closed-cell content of more than 90%) will have a thermal conductivity determined by the gas phase thermal conductivity of the blowing agent. For foams with an intermediate level (20-80%) of open cell and/or closed cell content, the thermal conductivity of the foam will be determined by the volume fraction and the thermal conductivity of the blowing agent.

For several different applications where thermal insulation is required, it is desirable that the insulation material exhibit low flammability. Flammability of a material may be evaluated by several different methods known to those skilled in the art. One method is to measure the Limiting Oxygen Index (LOI), which represents the concentration of oxygen required to sustain a flame during the burning of a material (ASTM 2863). The higher the LOI of a material the lower is its flammability. Thus it is desirable that insulating foams exhibit as high a LOI as possible. In an embodiment, the disclosed foam has a limiting oxygen index (LOI) of at least 23, or at least 25, or at least 30.

In addition to the closed cell content, the size of the cells in a foam can also affect the resulting thermal conductivity. In addition to thermal properties, the cell size of the foam can also affect other properties of the foam, such as but not limited to the mechanical properties. In general, it is desirable that the cells of the foam be small and uniform. However, the size of the cells cannot be reduced indefinitely because for a given density foam if the cell size becomes too small the thickness of the cell walls can become exceedingly thin and hence can become weak and rupture during the blowing process or during use. Hence, there is an optimum size for the cells depending on the density of the foam and its use. In one embodiment, a cell, either an open-cell or a closed-cell, has an average size of less than 500 microns. In another embodiment, the cell has an average size of less than 300 microns and in yet another embodiment the cell has an average size of less than 200 microns. Cell size may be measured by different methods known to those skilled in the art of evaluating porous materials. In one method, thin sections of the foam can be cut and subjected to optical or electron microscopic measurement, such as using a Hitachi S2100 Scanning Electron Microscope available from Hitachi instruments (Schaumburg, Ill.).

In an embodiment, the continuous polymer phase further comprises one or more surfactants, with at least one of ionic or non-ionic surfactants, including polymeric surfactants. A class of suitable surfactants includes siloxane-oxyalkylene copolymers such as those containing Si—O—C as well as Si—C linkages. The siloxane-oxyalkylene copolymers can be block copolymers or random copolymers. Typical siloxane-oxyalkylene copolymers contain a siloxane moiety composed of recurring dimethylsiloxy units endblocked with mononethylsiloxy and/or trimethylsiloxy units and at least one polyoxyalkylene chain composed of oxyethylene and/or oxypropylene units capped with an organic group such as an ethyl group. Suitable siloxane-oxyalkylene copolymeric surfactants include, but are not limited to, polyether-modified polysiloxanes, available as Tegostab B8406 from Evonik Goldschmidt Corporation (Hopewell, Va.); (polyalkyleneoxide modified heptamethyltrisiloxane available as Silwet L-77 from OSi Specialties (Danbury Conn.).

Another class of suitable surfactants includes silicone surfactants such as, L-7003, L-5350, L-5420, and L-5340 silicone surfactants, all available from Union Carbide Corporation, DC 193 available from Dow Chemical Co. (Midland, Mich.), and SF™1188 silicone surfactant available from GE Bayer Silicones.

Another class of suitable surfactants includes non-ionic organic surfactants such as the condensation products of alkylene oxides such as ethylene oxide, propylene oxide or mixtures thereof, and alkylphenols such as nonylphenol, dodecylphenol, and the like. Suitable non-ionic organic surfactants include, but are not limited to, polysorbate (Tween®) surfactant, for example Tween® 20, Tween® 21, Tween® 61, Tween® 80 or Tween® 81 all available from Aldrich Chemical Company; Pluronic® non-ionic surfactants available from BASF Corp., (Florham Park, N.J.); Tergitol™; Brij® 98, Brij® 30, and Triton X 100, all available from Aldrich Chemical Company; and Merpol®LF available from E.I. du Pont de Nemours and Company (Wilmington Del.). Suitable ionic surfactant includes, but is not limited to sodium dodecylsulfonate (SDS).

In other embodiment, the continuous polymer phase further comprises one or more acid catalysts. Suitable acid catalysts include, but are not limited to, benzenesulfonic acid, para-toluenesulfonic acid, xylenesulfonic acid, naphthalenesulfonic acid, ethylbenzenesulfonic acid, phenolsulfonic acid, sulfuric acid, phosphoric acid, boric acid, hydrochloric acid or mixtures thereof.

In another embodiment, the continuous polymer phase further comprises one or more additives. Suitable additives include, but are not limited to, cellulose fiber, bacterial cellulose, sisal fiber, clays, Kaolin-type clay, mica, vermiculite, sepiolite, hydrotalcite and other inorganic platelet materials, glass fibers, polymeric fibers, alumina fibers, aluminosilicate fibers, carbon fibers, carbon nanofibers, poly-1,3-glucan, lyocel fibers, chitosan, boehmite (AlO.OH), zirconium oxide, or mixtures thereof. The additive can also be a plasticizer comprising a polyester polyol, formed by the reaction of a polybasic carboxylic acid with a polyhydridic alcohol selected from a dihydridic to a pentahydridic. Examples of the acid include but are not limited to adipic acid, sebacic acid, naphthalene-2,6-dicarboxylic acid, cyclohexane-1,3-dicarboxylic acid, phthalic acid. Examples of the polyhydric alcohol include but are not limited to ethylene glycol, propylene diol, propylene glycol, 1,6-hexane diol, 1,4-butane diol and 1,5-pentane diol. In an embodiment, the plasticizer is polyester polyol. The average molecular weight is in the range of 100-50,000 g/mol, or 200-40,000 g/mol, or 200-1000 g/mol.

In one embodiment, the tannin-based foam is disposed between two similar or dissimilar non-foam materials, also called facers to form a sandwich panel structure. Any suitable material can be used for the facers. In one embodiment, the facers may be formed from a metal such as, but not limited to aluminum and stainless steel. In another embodiment, the facers may be formed from plywood, cardboard, composite board, oriented strand board, gypsum board, fiber glass board, and other building materials known to those skilled in the art. In another embodiment, the facers may be formed from nonwoven materials derived from glass fibers and/or polymeric fibers such as Tyvek® and Typar® available from E.I. DuPont de Nemours & Company. In another embodiment, the facers may be formed from woven materials such as canvas and other fabrics. Yet, in another embodiment, the facers may be formed of polymeric films or sheets. Exemplary polymers for the facer may include, but are not limited to, polyethylene, polypropylene, polyesters, and polyamides.

The disclosed tannin-based foams are bio-derived, low density rigid foams, having low thermal conductivity and low flammability. The disclosed tannin foams could be used for a variety of applications, including, but not limited to, thermal insulation of building envelopes, and household and industrial appliances. Furthermore, the disclosed foams can also be used in combination with other materials such as silica aerogels as a support for the fragile aerogel, and potentially as a catalyst support. Additional advantages of the disclosed foams include, but are not limited to, the use of less toxic materials, zero formaldehyde emission, improved flame resistance, mold resistance, enhanced biodegradability, and micro-organism resistance.

In accordance with the present invention, there is provided a process of making a tannin-based foam. The process comprises forming an agglomerate-free solution comprising a tannin, a monomer, and water.

The tannin used in the tannin-phenolic foam may be bio-derived tannin, syntan, or a mixture thereof. Suitable bio-derived tannin comprises mimosa, acacia, quebracho, pine, spruce, fir, tanoak, oak, birch, maple, eucalyptus, tara, catechu, or mixtures thereof. In an embodiment, the tannin is dried. The tannin may be dried at a temperature in the range of 50-200° C., or 80-150° C., or 90-120° C. for an amount of time in the range of 1-7 days, or 1-5 days, or 1-3 days before the step of mixing the tannin with a monomer, and water. In another embodiment, the tannin is used as is. The amount of dried tannin is in the range of 10-99.9%, or 50-99%, or 80-98%, by weight, based on the total weight of the agglomerate-free solution.

Suitable monomer comprises furfural, glyoxal, acetaldehyde, 5-hydroxymethylfurfural, acrolein, levulinate esters, sugars, 2,5-furandicarboxylic acid, 2,5-furandicarboxylic aldehyde, urea, difurfural (DFF), furfuryl alcohol, glycerol, sorbitol, lignin, or mixtures thereof. The amount of the monomer present in the mixture is in the range of 5-80%, or 10-70%, or 15-50%, by weight, based on the total weight of the agglomerate-free solution.

Other suitable biomass derived monomers are disclosed in "*Liquid Phase catalytic Processing of Biomass-derived Oxygenated Hydrocarbons to fuels and Chemicals*", by Chheda et. al. in *Angewandte Chemie, Int.*, 2007, 46, 7164-7183, the disclosure of which is incorporated by reference herein in its entirety.

The step of forming an agglomerate-free solution comprises mixing a tannin with a monomer, and water to form a mixture and providing a residence time to the mixture to effectively dissolve the tannin in the mixture. At the start of the residence time, the mixture may comprise agglomerates of tannin, wherein one may observe a two phase system with one phase being agglomerates of tannin and the other phase being liquid comprising dissolved tannin in a monomer, and water. As the agglomerates of tannin dissolves, the mixture becomes more viscous. At the end of the residence time, the mixture is a one phase system comprising dissolved tannin in a monomer, and water. The step of providing a residence time may involve keeping the mixture still for the residence time, or mixing the mixture for a certain amount of time, or mixing and keeping still for the rest of the residence time.

Any suitable method can be used to mix a tannin with a monomer, and water, to form an agglomerate-free solution, such as, for example, hand mixing, mechanical mixing using a Kitchen-aid® mixer, a twin screw extruder, a bra-blender, an overhead stirrer, a ball mill, an attrition mill, a Waring blender, or a combination thereof.

In an embodiment, the step of forming an agglomerate-free solution comprising a tannin, a monomer, and water can include first mixing the tannin with water and then adding the monomer to the mixture of tannin and water. In other embodiment, the step of forming an agglomerate-free solution comprising a tannin, a monomer, and water can include first mixing the tannin with the monomer and then adding water to the mixture of tannin and monomer. In another embodiment, the step of forming an agglomerate-free solution comprising a tannin, a monomer, and water can include first mixing the monomer with water and then adding tannin to the mixture of monomer and water.

When the tannin is first mixed with a monomer and/or water, it may form a two phase system with one phase comprising agglomerates of tannin and the second phase comprising dissolved tannin in the monomer and water. However, after a certain amount of residence time, the two phase system will become a single phase system, i.e., an agglomerate-free solution comprising dissolved tannin, the monomer, and water. The amount of residence time needed to obtain an agglomerate-free solution will depend on the temperature at which the tannin is mixed with a monomer, and water and also on the composition and the extent of mixing.

The process of making a tannin-based foam also comprises mixing one or more blowing agents with the agglomerate-free solution to form a pre-foam mixture. In an embodiment, at least one of the one or more blowing agents has a gas phase thermal conductivity of less than or equal to 0.016 W/m·K or less than or equal to 0.014 W/m·K or less than or equal to 0.012 W/m·K at 25° C. In other embodiment, at least one of the one or more blowing agents is 1,1,1,4,4,4-hexafluoro-2-butene available as FEA-1100 from E.I. du Pont de Nemours and Company (Wilmington, Del.). Suitable blowing agents include, but are not limited to carbon dioxide; hydrocarbons such as pentane, isopentane, cyclopentane petroleum ether, and ether; hydrochlorofluorocarbons such as 1,1-dichloro-1-fluoroethane (HCFC-141b); 2,2-dichloro-1,1,1,2-trifluoroethane (HCFC-123); 1-chloro-1,1-difluoroethane (HCFC-142b); 1,1,1,2-tetrafluoroethane (HCFC-134a); 1,1,1,3,3-pentafluoropropane (HFC-245fa) available from Honeywell (Morristown, N.J.); 1,1,1,3,3-pentafluorobutane (HFC-365) available as Solkane® 365mfc from Solvay Chemicals (Bruxelles, Belgium); incompletely halogenated hydrocarbons such as 2-chloropropane; fluorocarbons such as dichlorodifluoromethane, 1,2-dichloro-1,1,2,2-tetrafluoroethane (CFC-114), trichlorotrifluoroethane (CFC-113), trichloromonofluoromethane (CFC-11), or mixtures thereof. The amount of blowing agent is in the range of 1-30%, or 1-20%, or 1-10%, by weight, based on the total weight of the agglomerate-free solution.

The process of making a tannin-based foam further comprises mixing 5-30%, or 10-25%, or 10-20%, by weight of an acid catalyst with the pre-foam mixture to form a foam composition, based on the total weight of the agglomerate-free solution. In an embodiment, the acid catalyst comprises benzenesulfonic acid, para-toluenesulfonic acid, xylenesulfonic acid, naphthalenesulfonic acid, ethylbenzenesulfonic acid, phenolsulfonic acid, sulfuric acid, phosphoric acid, boric acid, hydrochloric acid or mixtures thereof. In another embodiment, the acid catalyst comprises para-toluenesulphonic acid and xylenesulphonic acid in a weight ratio in the range of 0.67:1 to 9:1, or 2:1 to 7:1, or 3:1 to 5:1. In other embodiment, the acid catalyst is dissolved in a minimum amount of solvent, the solvent comprising ethylene glycol, propylene glycol, dipropylene glycol, butyrolactone, dimethyl sulfoxide, N-methyl-2-pyrrolidone, morpholines, propane diol, or mixtures thereof. A catalyst is normally required to produce the foam but in some cases, a foam can be made without a catalyst but rather using thermal aging. A combination of thermal aging and a catalyst is commonly used. In some cases, the reaction is exothermic and hence little or no additional heat may be required.

In an embodiment, a small amount of catalyst, between 5-40% or 5-20%, by weight of the total amount of the acid to be added maybe added to the tannin during the step of forming an agglomerate-free solution and thereby allowing some pre-reaction prior to foaming for an amount of time in the range of 5 min to 24 h.

The process of making a tannin-based foam also comprises processing the foam composition to form a foam comprising a continuous polymeric phase defining a plurality of cells, and a discontinuous phase comprising the one or more blowing agents disposed in at least a portion of the plurality of cells. The step of processing the foam composition comprises maintaining the foam composition at an optimum temperature. In an embodiment, the optimum temperature is in the range of 25-100° C., or 35-90° C., or 45-85° C. In another embodiment, the step of processing the foam composition comprises foaming the foam composition in a substantially closed mold. In one embodiment, the foam composition is first foamed at an optimum temperature in the range of 25-100° C., or 35-90° C., or 45-85° C. in an open mold and then the mold is closed and kept at that temperature for an amount of time in the range of 25-100° C., or 35-90° C., or 45-85° C. As used herein, the term "closed mold" means partially closed mold where some gas may escape, or completely closed mold, where the system is sealed. In some cases, the foam is formed in a closed mold or under application of pressure to control the foam density. Pressures from atmospheric to up to 5000 kPa may be applied depending upon the desired foam density.

In one embodiment, the process of making a tannin-based foam comprises adding a surfactant to the agglomerate-free solution. In another embodiment, a surfactant is added to the pre-foam mixture. The surfactant is first mixed with the blowing agent and then the mixture of blowing agent and surfactant is mixed with the agglomerate-free solution to form a pre-foam mixture. In another embodiment, a surfactant is mixed with the acid catalyst. The amount of surfactant present in at least one of the agglomerate-free solution, the pre-foam mixture, or the foam composition is in the range of 0.5-10%, or 2-8%, or 3-6%, by weight, based on the total weight of the agglomerate-free solution.

The surfactant is present in an effective amount to emulsify the agglomerate-free solution, the blowing agent, the catalyst and optional additives of the foam composition. The surfactant is added to lower the surface tension and stabilize the foam cells during foaming and curing. The surfactant is at least one of ionic or non-ionic surfactants, including polymeric surfactants. A class of suitable surfactants includes siloxane-oxyalkylene copolymers such as those containing Si—O—C as well as Si—C linkages. The siloxane-oxyalkylene copolymers can be block copolymers or random copolymers. Typical siloxane-oxyalkylene copolymers contain a siloxane moiety composed of recurring dimethylsiloxy units endblocked with mononethylsiloxy and/or trimethylsiloxy units and at least one polyoxyalkylene chain composed of oxyethylene and/or oxypropylene units capped with an organic group such as an ethyl group. Suitable siloxane-oxyalkylene copolymeric surfactants include, but are not limited to, polyether-modified polysiloxanes, available as Tegostab B8406 from Evonik Goldschmidt Corporation (Hopewell, Va.); (polyalkyleneoxide modified heptamethyltrisiloxane available as Silwet L-77 from OSi Specialties (Danbury Conn.).

Another class of suitable surfactants includes silicone surfactants such as, L-7003, L-5350, L-5420, and L-5340 silicone surfactants, all available from Union Carbide Corporation, DC 193 available from Dow Chemical Co. (Midland, Mich.), and SF™ 1188 silicone surfactant available from GE Bayer Silicones.

Another class of suitable surfactants includes non-ionic organic surfactants such as the condensation products of alkylene oxides such as ethylene oxide, propylene oxide or mixtures thereof, and alkylphenols such as nonylphenol, dodecylphenol and the like. Suitable non-ionic organic surfactants include, but are not limited to, polysorbate (Tween®) surfactant, for example Tween® 20, Tween® 21, Tween® 61, Tween® 80 or Tween® 81 all available from Aldrich Chemical Company; Pluronic® non-ionic surfactants available from BASF Corp., (Florham Park, N.J.); Tergito™; Brij® 98, Brij® 30, and Triton X 100, all available from Aldrich Chemical Company; and Merpol®LF available from E.I. du Pont de Nemours and Company (Wilmington Del.). Suitable ionic surfactant includes, but is not limited to sodium dodecylsulfonate (SDS).

In an embodiment, the process of making a tannin-based foam further comprises adding an additive to at least one of the agglomerate-free solution or the pre-foam mixture. The amount of additive is in the range of 5-50%, or 10-45%, or 15-40%, by weight based on the total weight of the agglomerate-free solution. Suitable additives include, but are not limited to, cellulose fiber, bacterial cellulose, sisal fiber, clays, Kaolin-type clay, mica, vermiculite, sepiolite, hydrotalcite and other inorganic platelet materials, glass fibers, polymeric fibers, alumina fibers, aluminosilicate fibers, carbon fibers, carbon nanofibers, poly-1,3-glucan, lyocel fibers, chitosan, boehmite (AlO.OH), zirconium oxide, or mixtures thereof. The additive can also be a plasticizer comprising a polyester polyol, formed by the reaction of a polybasic carboxylic acid with a polyhydridic alcohol selected from a dihydridic to a pentahydridic. Examples of the acid include but are not limited to adipic acid, sebacic acid, naphthalene-2,6-dicarboxylic acid, cyclohexane-1,3-dicarboxylic acid, phthalic acid. Examples of the polyhydric alcohol include but are not limited too ethylene glycol, propylene diol, propylene glycol, 1,6-hexane diol, 1,4-butane diol and 1,5-pentane diol. In an embodiment, the plasticizer is polyester polyol. The average molecular weight is in the range of 100-50,000 g/mol, or 200-40,000 g/mol, or 200-1000 g/mol.

In one embodiment, the process of making a tannin-based foam further comprises disposing a tannin-based foam between two similar or dissimilar non-foam materials, also called facers to form a sandwich panel structure. Any suitable material can be used for the facers. In one embodiment, the facers may be formed from a metal such as, but not limited to aluminum and stainless steel. In another embodiment, the facers may be formed from plywood, cardboard, composite board, oriented strand board, gypsum board, fiber glass board, and other building materials known to those skilled in the art. In another embodiment, the facers may be formed from nonwoven materials derived from glass fibers and/or polymeric fibers such as Tyvek® and Typar® available from E.I. DuPont de Nemours & Company. In another embodiment, the facers may be formed from woven materials such as canvas and other fabrics. Yet, in another embodiment, the facers may be formed of polymeric films or sheets. Exemplary polymers for the facer include, but are not limited to, polyethylene, polypropylene, polyesters, and polyamides.

The thickness of the facer material would vary depending on the application of the sandwich panel. In some cases, the thickness of the facer material could be significantly smaller than the thickness of the foam while in other cases the thickness of the facer material could be comparable or even greater than the thickness of the sandwiched foam.

In some embodiments, the facer material may be physically or chemically bonded to the tannin-based foam to increase the structural integrity of the sandwich panel. Any suitable method can be used for physical means of bonding including, but not limited to, surface roughening by mechanical means and etching by chemical means. Any suitable method can be used for chemical bonding including, but not limited to, use of coatings, primers, and adhesion promoters that form a tie layer between the facer surface and the foam.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the phrase "one or more" is intended to cover a non-exclusive inclusion. For example, one or more of A, B, and C implies any one of the following: A alone, B alone, C alone, a combination of A and B, a combination of B and C, a combination of A and C, or a combination of A, B, and C.

Also, use of "a" or "an" are employed to describe elements and described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the disclosed compositions, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

In the foregoing specification, the concepts have been disclosed with reference to specific embodiments. However, one of ordinary skill in the art appreciates that various modifications and changes can be made without departing from the scope of the invention as set forth in the claims below.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all embodiments.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

The concepts disclosed herein will be further described in the following examples, which do not limit the scope of the invention described in the claims.

The examples cited here relate to tannin-based foams. The discussion below describes how a tannin-based foam without use of formaldehyde is formed.

EXAMPLES

Test Methods

Density Measurement

Apparent density ($\rho$) of the foams was measured by a) cutting a foam into a regular shape such as a rectangular cube or cylinder, b) measuring the dimensions and the weight of the foam piece, c) evaluating the volume of the foam piece and then dividing the weight of the foam piece by the volume of the foam piece.

More specifically, three cylindrical pieces were cut from a test foam using a brass corer having an internal diameter of 1.651 mm (0.065') to calculate the average apparent density of the test foam. The diameter and the length of the cylindrical pieces were measured using Vernier calipers and then the volume (V) of the cylinder was calculated. The mass (m) of each cylindrical piece was measured and used to calculate the apparent density ($\rho_a$) of each foam piece.

$$\rho_a = \frac{m}{V}$$

Open-Cell Content

Open-cell content of foams was determined using ASTM standard D6226-5. All measurements were made at room temperature of 24° C.

Pycnometer density ($\rho$) of each cylindrical piece was measured using a gas pycnometer, Model # Accupyc 1330 (Micromeritics Instrument Corporation, Georgia, U.S.A) at room temperature using nitrogen gas.

The AccuPyc works by measuring the amount of displaced gas. A cylindrical foam piece was placed in the pycnometer chamber and by measuring the pressures upon filling the chamber with a test gas and discharging it into a second empty chamber, volume ($V_s$) of the cylindrical foam piece that was not accessible to the test gas was calculated. This measurement was repeated five times for each foam cylindrical piece and the average value for $V_s$ was calculated.

The volume fraction of open-cells ($O_v$) in a foam sample was calculated by the following formula:

$$O_v = \frac{(V - V_s)}{V}$$

Assuming the specific gravity of the solid tannin polymer to be 1 g/cm³, the volume fraction of the cell walls ($CW_v$) was calculated from the following formula:

$$CW_v = \frac{m}{V}$$

Thus the volume fraction of closed cells ($C_v$) was estimated by the following equation:

$$C_v = 1 - O_v - CW_v$$

Thermal Conductivity

Hot Disk Model #PPS 2500S (Hot Disk AB, Gothenberg, Sweden) was used to measure thermal conductivities of the foams.

A foam whose thermal conductivity needed to be measured was cut into two rectangular or circular test pieces of same size. The lateral dimensions and the thickness of the foam pieces were required to be greater than four times the radius of the Hot Disk heater and sensor coil. The radius of the heater and sensor coil for all measurements was 6.4 mm and hence the lateral dimensions and the thickness of the foam pieces were greater than 26 mm.

Before the start of a measurement protocol, the heater and sensor coil was sandwiched between two test pieces of foam and the entire assembly was clamped together to ensure intimate contact between the surfaces of the foam pieces and the heater and sensor coil.

At the start of a test, a known current and voltage was applied to the heater and sensor coil. As the heater and sensor coil heated up due to the passage of current through the coil, the energy was dissipated to the surrounding test pieces of foam. At regular time intervals during the experiment, the resistance of the heater and sensor coil was also measured using a precise wheat stone bridge built into the Hot Disk apparatus. The resistance was used to estimate the instantaneous temperature of the coil. The temperature history of the heater and sensor coil was then used to calculate the thermal conductivity of the foam using mathematical analysis presented in detail by Yi He in Thermochimica Acta 436, pp 122-129, 2005.

The test pieces of foam were allowed to cool and the thermal conductivity measurement on the test pieces was repeated two more times. The thermal conductivity data was then used to calculate the average thermal conductivity of the foam.

Starting Materials

As used in the Examples below, mimosa tannin was purchased from SilvaTeam (Italy). Furfuryl alcohol and furfural were purchased from Sigma-Aldrich (St. Louis, Mo.). Surfactants, Tegostab B8406 (polyether-modified polysiloxane) was purchased from Evonik Goldschmidt Corporation (Hopewell, Va.) and DC 193 was purchased from Dow Chemical Co. (Midland, Mich.). Acid catalysts p-toluenesulfonic acid and xylenesulfonic acid were purchased from Sigma-Aldrich (St. Louis, Mo.). Blowing agents pentane was purchased from Sigma-Aldrich (St. Louis, Mo.) and FEA-1100 (1,1,1,4,4,4-hexafluoro-2-butene) was purchased from E.I. du Pont de Nemours and Company (Wilmington, Del.).

Example 1: Preparation of Formaldehyde-Free Tannin-Based Foam (FFTF-1) with FEA-1100

Mimosa tannin was dried at 100° C. for 2 days before use. Furfuryl alcohol (8 g), water (6 g), and a surfactant Tegostab B8406 (1 g) was mixed and added to mimosa tannin (20 g). The mixture was stirred with a spatula three times and left at room temperature for 3 h. The above mixture (10 g) was removed and FEA-1100 (2 g) was mixed into the mixture until a stable weight was achieved. Next p-toluenesulfonic acid/xylenesulfonic acid (1.25 g, a 70/30 mixture dissolved in a minimum amount of ethylene glycol) was added and mixed for 2 min. The material was then transferred to a 250 mL polypropylene bottle and placed in an oven at 60° C. with the cap off. After 4.5 min, the cap was placed on the bottle and the bottle along with its contents was left in the oven at 60° C. After 3 days, the cap was removed, and the bottle was left uncapped at 50° C. for an additional 1 day to remove any volatiles. The as-prepared formaldehyde-free tannin-based foam, FFTF-1 had an open cell of 12.7% and an apparent density of 0.05 g/cc. The thermal conductivity of the foam, FFTF-1 was measured to be 0.025 W/m·K.

Example 2: Preparation of Formaldehyde-Free Tannin-Based Foam (FFTF-2) with Pentane Mimosa tannin was dried at 100° C. for 2 days before use. Furfuryl alcohol (40 g), water (30 g), and a surfactant Tegostab B840 (5 g) was mixed and added to mimosa tannin (100 g). The mixture was stirred with a spatula three times and left at room temperature for 12-18 h. A portion (20 g) of the above mixture was removed and a pentane (1.5 g) was mixed into the mixture until a stable weight was achieved. Next p-toluenesulfonic acid/xylenesulfonic acid (3 g, a 70/30 mixture dissolved in a minimum amount of ethylene glycol) was added and mixed for 2 min. The material was then transferred to a 500 mL polypropylene bottle and placed in a water bath at 50° C. with the cap off. After 5 min, the cap was placed on the bottle and the bottle along with its contents was placed in an oven at 50° C. for 12-18 h. The cap was then removed, and the bottle was left uncapped at 50° C. for an additional 1 day to remove any volatiles. The as-prepared formaldehyde-free tannin-based foam. FFTF-2 had an open cell of 6.24% and an apparent density of 0.036 g/cc. The thermal conductivity of the foam, FFTF-2 was measured to be 0.026 W/m·K.

Example 3: Preparation of Formaldehyde-Free Tannin-Based Foam (FFTF-3) with Pentane Mimosa tannin was dried at 100° C. for 2 days before use. Furfuryl alcohol (4 g), furfural (4 g), water (6 g), and a surfactant DC 193 (1 g) was mixed and added to mimosa tannin (10 g). The mixture was stirred with a spatula three times and left at room temperature for 4 h. A portion (10 g) of the above mixture was removed and a foam expansion agent (1.5 g of pentane) was mixed into the mixture until a stable weight was achieved. Next p-toluenesulfonic acid/xylenesulfonic acid (1.25 g, a 70/30 mixture dissolved in a minimum amount of ethylene glycol) was added and mixed for 3 min. The material was then transferred to a 250 mL polypropylene bottle and placed in a water bath at 50° C. with the cap off. After 10 min in the water bath, the cap was placed on the bottle and the bottle along with its contents was placed in an oven at 50° C. After 3 days, the cap was removed, and the bottle was left uncapped at 50° C. for an additional 1 day to remove any volatiles. The as-prepared formaldehyde-free tannin-based foam, FFTF-3 had an open cell of 6.37% and an apparent density of 0.045 g/cc. The thermal conductivity of the foam, FFTF-3 was measured to be 0.026 W/m·K.

Example 4: Preparation of Formaldehyde-Free Tannin-Based Foam (FFTF-4) with Pentane Mimosa tannin was dried at 100° C. for 2 days before use. Furfuryl alcohol (4 g), furfural (4 g), water (6 g), and Tegostab B8406 (1 g) was mixed and added to the mimosa tannin (10 g). The mixture was stirred with a spatula three times and left at room temperature for 4 h. A portion (15 g) of the above mixture was removed and pentane (1 g) was mixed into the mixture until a stable weight was achieved.

Next p-toluenesulfonic acid/xylenesulfonic acid (1.8 g, a 70/30 mixture dissolved in a minimum amount of ethylene glycol) was added and mixed for 3 min. The material was then transferred to a 250 mL polypropylene bottle and placed in a water bath at 50° C. with the cap off. After 10 min in the water bath, the cap was placed on the bottle and the bottle along with contents was placed in an oven at 50° C. After 3 days, the cap was removed, and the bottle was left for an additional 1 day at 50° C., to remove any volatiles. The as-prepared formaldehyde-free tannin-based foam, FFTF-4 had an open cell of 9.8% and an apparent density of 0.049 g/cc. The thermal conductivity of the foam, FFTF-4 was measured to be 0.027 W/m·K.

Example 5: Preparation of Formaldehyde-Free Tannin-Based Foam (FFTF-5) with FEA-1100

Mimosa tannin was dried at 100° C. for 2 days before use. Furfuryl alcohol (8 g), water (6 g), and a surfactant (1 g, Evonik Tegostab B8406) was mixed and added to mimosa tannin (20 g). The mixture was stirred with a spatula three times and left at room temperature for 3 h. A portion (14.68 g) of the above mixture was removed and a foam expansion agent (3.9 g, FEA-1100, DuPont, Wilmington, Del.) was mixed into the mixture until a stable weight was achieved. Next p-toluenesulfonic acid/xylenesulfonic acid (2 g, a 70/30 mixture dissolved in a minimum amount of ethylene glycol) was added and mixed for 2 min. The material was then transferred to a 250 mL polypropylene bottle and placed in an oven at 50° C. with the cap off. After 4.5 min in the oven, the cap was placed on the bottle and the bottle along with its contents was left in the oven at 50° C. After 3 days, the cap was removed, and the bottle was left at 50° C. for an additional 1 day to remove any volatiles. The as-prepared formaldehyde-free tannin-based foam, FFTF-5 had an open cell of 34.52% and an apparent density of 0.088 g/cc. The thermal conductivity of the foam, FFTF-5 was measured to be 0.036 W/m·K.

Example 6: Preparation of Formaldehyde-Free Tannin-Based Foam (FFTF-6) with FEA-1100

Example 3 was repeated with the exception that after the 4 h mixing, a portion (10 g) of the above mixture was removed and FEA-1100 (1.8 g) was mixed into the mixture until a stable weight was achieved, followed by addition of p-toluenesulfonic acid/xylenesulfonic acid (2.4 g, a 70/30 mixture dissolved in a minimum amount of ethylene glycol). The foaming procedure as described in the Example 1 was used. The as-prepared formaldehyde-free tannin-based foam, FFTF-6 had an open cell of 10% and an apparent density of 0.05 g/cc. The thermal conductivity of the foam, FFTF-6 was measured to be 0.025 W/m·K.

Example 7: Preparation of Formaldehyde-Free Tannin-Based Foam (FFTF-7) with FEA-1100

Mimosa tannin was dried at 100° C. for 2 days before use. Furfuryl alcohol (2 g), furfural (2 g), water (3 g), and a surfactant DC-193 (0.5 g) was mixed and added to the mimosa tannin (10 g). The mixture was stirred with a spatula three times and left at room temperature for 2 h. FEA-1100 (3 g) was mixed into the above mixture until a stable weight was achieved. Next p-toluenesulfonic acid/xylenesulfonic acid (1.87 g, a 70/30 mixture dissolved in a minimum amount of ethylene glycol) was added and mixed for 3 min. The material was then transferred to a 250 mL polypropylene bottle and placed in an oven at 50° C. with the cap off. After 8 min in the oven, the cap was placed on the bottle and the bottle along with contents was left the oven at 50° C. After 3 days, the cap was removed and the bottle was left at 50° C. for an additional 1 day to remove any volatiles. The as-prepared formaldehyde-free tannin-based foam, FFTF-7 had an open cell of 15% and an apparent density of 0.054 g/cc. The thermal conductivity of the foam, FFTF-7 was measured to be 0.028 W/m·K.

Example 8: Preparation of Formaldehyde-Free Tannin-Based Foam (FFTF-8) with FEA-1100

Example 7 was repeated with the exception that 10 g of the mixture of tannin, furfural alcohol, furfural, water, and surfactant was mixed with FEA-1100 (2 g). Next p-toluenesulfonic acid/xylenesulfonic acid (1.25 g, a 70/30 mixture dissolved in a minimum amount of ethylene glycol) was added and mixed for 3 min. The foaming procedure as described in the Example 4 was used. The as-prepared formaldehyde-free tannin-based foam, FFTF-8 had an open cell of 6.89% and an apparent density of 0.05 g/cc. The thermal conductivity of the foam, FFTF-8 was measured to be 0.026 W/m·K.

Example 9: Preparation of Formaldehyde-Free Tannin-Based Foam (FFTF-9) with FEA-1100

Example 7 was repeated with the exception that the foaming temperature was 60° C. The as-prepared formaldehyde-free tannin-based foam, FFTF-9 had an open cell of 6.89% and an apparent density of 0.042 g/cc. The thermal conductivity of the foam, FFTF-9 was measured to be 0.025 W/m·K.

Example 10: Preparation of Formaldehyde-Free Tannin-Based (FFTF-10) Foam with FEA-1100

Example 7 was repeated with the exception that p-toluenesulfonic acid/xylenesulfonic acid (0.25 g, a 70/30 mixture dissolved in a minimum amount of ethylene glycol) was added to the mixture comprising furfuryl alcohol, furfural, water, surfactant and tannin and the mixture left for 12-18 h. FEA-1100 (2 g) was mixed into the above mixture until a stable weight was achieved. Next p-toluenesulfonic acid/xylenesulfonic acid (1 g, a 70/30 mixture dissolved in a minimum amount of ethylene glycol) was added and mixed for 3 min. The foaming procedure as described in the Example 4 was used with the exception that the bottle was not capped, i.e. an open system. The as-prepared formaldehyde-free tannin-based foam, FFTF-10 had an open cell of 7% and an apparent density of 0.058 g/cc. The thermal conductivity of the foam. FFTF-10 was measured to be 0.025 W/m·K.

Example 11: Preparation of Formaldehyde-Free White Spruce Tannin-Based Foam (FFTF-11) with Pentane White spruce tannin was extracted from the bark of a North American Spruce tree by boiling the bark (1 Kg) in water at 95° C. for 2 h. The as-prepared brown solution was filtered and dried, with an yield of white spruce tannin of 16 wt %. Next, the white spruce tannin (50 g) was added to furfuryl alcohol (38 g) and water (12 g) in a beaker, and the mixture was gently heated on a hot plate to 60° C. for 2 h. A portion (24 g) of the mixture containing the white spruce tannin was then further concentrated by heating in a beaker at 75° C. for 1 h to a final weight of 21.5 g. To a portion (18 g) of the concentrated mixture, a surfactant Tegostab B8406 (1.45 g) was added, followed by the addition of pentane (3.75 g) along with stirring until a constant weight of 3.75 g was achieved. Next, p-toluenesulfonic acid/xylenesulfonic acid (3.8 g, a 70/30 mixture dissolved in a minimum amount of ethylene glycol) was added and mixed for 2 min. The material was then transferred to a 500 mL polypropylene bottle and placed in an oven at 60° C. with the cap off. After 1 min, the cap was placed on the bottle and the bottle along with its contents was left in the oven at 60° C. After 4 h, the cap was removed, and the bottle was left uncapped at 50° C. for an additional 1 day to remove any volatiles. The as-prepared formaldehyde-free white spruce tannin-based foam, FFTF-11 had an open cell of 45% and an apparent density of 0.0258 g/cc.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense and all such modifications are intended to be included within the scope of invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A foam consisting of:
   (a) a continuous polymeric phase defining a plurality of cells, wherein:
      the continuous polymeric phase consists of a formaldehyde-free tannin-based resin derived from a tannin, furfuryl alcohol and an optional monomer excluding formaldehyde, the monomer comprising furfural, glyoxal, acetaldehyde, 5-hydroxymethylfurfural, acrolein, levulinate esters, sugars, 2,5-furandicarboxylic acid, 2,5-furandicarboxylic aldehyde, urea, difurfural (DFF), glycerol, sorbitol, lignin, or mixtures thereof,
      the plurality of cells comprises a plurality of open-cells and a plurality of closed-cells with an open-cell content measured according to ASTM D2856, of less than 40%; and
   (b) a gas phase comprising one or more blowing agents disposed in at least a portion of the plurality of closed-cells.

2. The foam of claim 1, wherein the tannin and furfuryl alcohol are present in a weight ratio in the range of 1:0.1 to 1:2.

3. The foam of claim 1, wherein the open-cell content measured according to ASTM D2856, is less than 20%.

4. The foam of claim 1, wherein the open-cell content measured according to ASTM D2856, is less than 30%.

5. The foam of claim 1, wherein the foam has a density in the range of 10-500 kg/m$^3$.

6. The foam of claim 1, wherein the foam has a density in the range of 20-100 kg/m$^3$.

7. The foam of claim 1, wherein at least one of the one or more blowing agents has a gas phase thermal conductivity of less than or equal to 0.016 W/m·K at 25° C.

8. The foam of claim 1, wherein at least one of the one or more blowing agents comprises 1,1,1,4,4,4-hexafluoro-2-butene, carbon dioxide, pentane, isopentane, cyclopentane petroleum ether, ether, 1,1-dichloro-1-fluoroethane, 2,2-dichloro-1,1,1-trifluoroethane, 1-chloro-1,1-difluoroethane, 1,1,1,2-tetrafluoroethane, 1,1,1,3,3-pentafluoropropane, 1,1,1,3,3-pentafluorobutane, 2-chloropropane, dichlorodifluoromethane, 1,2-dichloro-1,1,2,2-tetrafluoroethane, trichlorotrifluoroethane, trichloromonofluoromethane, or mixtures thereof.

9. The foam of claim 1, wherein the foam has a thermal conductivity in the range of 0.015-0.050 W/m·K.

10. The foam of claim 1, wherein the continuous polymeric phase further comprises one or more surfactants.

11. The foam of claim 1, wherein the tannin is derived from mimosa, acacia, quebracho, pine, spruce, fir, tanoak, oak, birch, maple, eucalyptus, tara, catechu, or mixtures thereof.

12. The foam of claim 1, wherein the foam has a limiting oxygen index of at least 23, measured according to ASTM-D2863.

13. An article comprising the foam of claim 1.

14. The article of claim 13 comprising a sandwich panel structure, wherein the sandwich panel structure comprises the foam disposed between two similar or dissimilar non-foam materials.

15. The article of claim 14 wherein the non-foam material comprises polymeric fibers.

16. The foam of claim 1, wherein the continuous polymeric phase further comprises one or more additives.

17. The foam of claim 16, wherein the one or more additives comprises cellulose fiber, bacterial cellulose, sisal fiber, clays, Kaolin-type clay, mica, vermiculite, sepiolite, hydrotalcite and other inorganic platelet materials, glass fibers, polymeric fibers, alumina fibers, aluminosilicate fibers, carbon fibers, carbon nanofibers, poly-1,3-glucan, lyocel fibers, chitosan, boehmite (AlO.OH), zirconium oxide, a polyester polyol, or mixtures thereof.

* * * * *